United States Patent
Harada et al.

(10) Patent No.: US 8,221,901 B2
(45) Date of Patent: Jul. 17, 2012

(54) MATERIAL FOR HEAT RESISTANT COMPONENT

(75) Inventors: Hiroshi Harada, Tsukuba (JP); Akihiro Sato, Tsukuba (JP); Kyoko Kawagishi, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 1202 days.

(21) Appl. No.: 11/887,254

(22) PCT Filed: Mar. 28, 2006

(86) PCT No.: PCT/JP2006/306268
§ 371 (c)(1),
(2), (4) Date: Dec. 28, 2007

(87) PCT Pub. No.: WO2006/104138
PCT Pub. Date: Oct. 5, 2006

(65) Prior Publication Data
US 2008/0226937 A1 Sep. 18, 2008

(30) Foreign Application Priority Data
Mar. 28, 2005 (JP) .................. 2005-092542

(51) Int. Cl.
*B32B 15/01* (2006.01)
*C23C 30/00* (2006.01)
(52) U.S. Cl. ........................ 428/680
(58) Field of Classification Search .......... None
See application file for complete search history.

(56) References Cited

U.S. PATENT DOCUMENTS

| | | | |
|---|---|---|---|
| 4,758,480 A * | 7/1988 | Hecht et al. | 428/680 |
| 6,830,827 B2 | 12/2004 | Narita et al. | |
| 2003/0075247 A1 | 4/2003 | Koizumi et al. | |
| 2004/0229075 A1 | 11/2004 | Gleeson et al. | |
| 2006/0093851 A1* | 5/2006 | Darolia et al. | 428/680 |
| 2009/0196760 A1* | 8/2009 | Harada et al. | 416/241 R |
| 2009/0274928 A1* | 11/2009 | Harada et al. | 428/680 |

FOREIGN PATENT DOCUMENTS
WO 99/23279 5/1999

OTHER PUBLICATIONS

NIMS Third Generation Nickel Base Single Crystal Superalloy TMS-75, Jul. 2006, National Institute for Materials Science, Ibaraki, Japan.*
NIMS Second Generation Single Crystal Superalloy TMS-82+, Aug. 2004, National Institute for Materials Science, Ibaraki, Japan.*
NIMS Fourth Generation Nickel Base Sincle Crystal Superalloy TMS-138/138A, Jul. 2006, National Institute for Materials Science, Ibaraki, Japan.*
J-Y Guedou, "Materials Evolution in Hot Parts of Aero-Turgo-Engines", Proc. ICAS 2010 Congress, Sep. 19, 1924, Nice, France.*

(Continued)

*Primary Examiner* — John J Zimmerman
(74) *Attorney, Agent, or Firm* — Wenderoth, Lind & Ponack, L.L.P.

(57) ABSTRACT

A heat resistant material, wherein one type or plural types of materials that do not generate interdiffusion with an Ni-based superalloy are coated on the Ni-based superalloy to prevent the interdiffusion of elements through the substrate/coating interface even at such high temperatures as 1100° C. or above 1100° C., is provided.

5 Claims, 8 Drawing Sheets

OTHER PUBLICATIONS

Toshiharu Kobayashi et al., Nippon Kinzoku Gakkaishi, "Influence of Alloying Elements on the Creep Strength of a $5^{th}$ Generation Single Crystal Superalloy TMS-173", vol. 69, No. 2, pp. 241-244. (2005). (English language translation, including Abstract).

Kyoko Kawagishi et al., Nippon Kinzoku Gakkaishi, "Development of Oxidation-Resistant β-Phase EQ Coating System for Ni-Base Superalloys". vol. 70, No. 2, pp. 188-191. (2006). (English language translation, including Abstract).

Akihiro Sato et al., Nippon Kinzoku Gakkaishi, "Development of New Coatings for Advanced Ni-Base Superalloys". vol. 70, No. 2, pp. 192-195. (2006). (English language translation, including Abstract).

* cited by examiner

PRIOR ART 1

EXAMPLE 1

US 8,221,901 B2

MATERIAL FOR HEAT RESISTANT COMPONENT

TECHNICAL FIELD

The present invention relates to heat resistant materials.

BACKGROUND ART

For coating materials for use in turbine blades and nozzle guide vane of jet engines and industrial gas turbines, conventionally, Al, Cr, Ni—Al, Pt—Al, MCrAlY are well known and actually utilized widely. However, when these coating materials are applied to a turbine blade made of an Ni-based superalloy and the turbine blade is used at high temperatures for a long period of time, interdiffusion of elements proceeds through the interface between the Ni-based superalloy and the coating material, and the interdiffusion of elements degrades the quality of material of the Ni-based superalloy, to generate such problems on material technology as lowering in strength and lowering in circumstance resistance property of the coating material that lead to lowering in the durability of the turbine blade itself. In particular, in these years, the gas temperature for jet engines and gas turbines is heightened, and, naturally, the temperature of the turbine blade rises, to accelerate further such diffusion phenomenon. In addition, high pressure turbine blades have a hollow construction for cooling, and, since reduction in the wall thickness is proceeding, the influence of the diffusion region constitutes a growing problem.

For the purpose of preventing the diffusion of elements through the substrate/coating interface, a diffusion barrier coating is examined (for example, see Patent Document 1). However, the diffusion barrier coating has a multilayer structure to complicate the coating process, and, in addition, since a substrate and a coating material are not in the thermodynamical equilibrium state, there is some limit of the effect as a natural result.

On the other hand, US 2004/0229075 (Patent Document 2), which has been published recently, discloses to decrease the diffusion of Al by coating of the γ+γ' phase containing Pt having a lowered concentration of Al element being an element that diffuses farthest and generates a harmful phase by diffusion. However, in this instance also, since the substrate and the coating material are not in the thermodynamical equilibrium state, during the use at high temperatures for a long period of time, Pt and Al diffuse from the coating material toward the inside, and a strengthening element diffuses from the substrate toward the outside, to develop the degradation of material. Thus, the effect is restrictive.

Patent Document 1: U.S. Pat. No. 6,830,827
Patent Document 2: U.S. Patent Application No. 2004/0229075

DISCLOSURE OF THE INVENTION

Problems that the Invention is to Solve

The present invention has such problem to be solved as providing a heat resistant material by which interdiffusion of elements through the substrate/coating interface is prevented even at such high temperatures as 1100° C. or above 1100° C.

Means for Solving the Problems

For solving the above problem, the invention is firstly characterized in that one type or plural types of materials are coated to an Ni-based superalloy, the materials generating no interdiffusion with the Ni-based superalloy.

The invention is secondly characterized in that a layer comprising at least one type of the γ phase, the γ' phase and the B2 phase having a composition that is thermodynamically equilibrated with an Ni-based superalloy is coated in one layer or in a multilayer.

The invention is thirdly characterized in that, to an Ni-based superalloy having a composition containing Al: not less than 1.0 wt % to not more than 10.0 wt %, Ta: not less than 0 wt % to not more than 14.0 wt %, Mo: not less than 0 wt % to not more than 10.0 wt %, W: not less than 0 wt % to not more than 15.0 wt %, Re: not less than 0 wt % to not more than 10.0 wt %, Hf: not less than 0 wt % to not more than 3.0 wt %, Cr: not less than 0 wt % to not more than 20.0 wt %, Co: not less than 0 wt % to not more than 20 wt %, Ru: not less than 0 wt % to not more than 14.0 wt %, Nb: not less than 0 wt % to not more than 4.0 wt %, Si: not less than 0 wt % to not more than 2.0 wt %, and the remains consisting of Ni and inevitable impurities, a layer comprising one type or two types of the γ phase and the γ' phase having a composition that is thermodynamically equilibrated with the Ni-based superalloy is coated in one layer or in a multilayer.

The invention is fourthly characterized in that, to an Ni-based superalloy having a composition containing Al: not less than 3.5 wt % to not more than 7.0 wt %, Ta: not less than 2.0 wt % to not more than 12.0 wt %, Mo: not less than 0 wt % to not more than 4.5 wt %, W: not less than 0 wt % to not more than 10.0 wt %, Re: not less than 0 wt % to not more than 8.0 wt %, Hf: not less than 0 wt % to not more than 0.50 wt %, Cr: not less than 1.0 wt % to not more than 15.0 wt %, Co: not less than 2 wt % to not more than 16 wt %, Ru: not less than 0 wt % to not more than 14.0 wt %, Nb: not less than 0 wt % to not more than 2.0 wt %, Si: not less than 0 wt % to not more than 2.0 wt %, and the remains consisting of Ni and inevitable impurities, a layer comprising one type or two types of the γ phase and the γ' phase having a composition that is thermodynamically equilibrated with the Ni-based superalloy is coated in one layer or in a multilayer.

The invention is fifthly characterized in that, to an Ni-based superalloy having a composition containing Al: not less than 5.0 wt % to not more than 7.0 wt %, Ta: not less than 4.0 wt % to not more than 10.0 wt %, Mo: not less than 1.1 wt % to not more than 4.5 wt %, W: not less than 4.0 wt % to not more than 10.0 wt %, Re: not less than 3.1 wt % to not more than 8.0 wt %, Hf: not less than 0 wt % to not more than 0.50 wt %, Cr: not less than 2.0 wt % to not more than 10.0 wt %, Co: not less than 0 wt % to not more than 15.0 wt %, Ru: not less than 4.1 wt % to not more than 14.0 wt %, Nb: not less than 0 wt % to not more than 2.0 wt %, Si: not less than 0 wt % to not more than 2.0 wt %, and the remains consisting of Ni and inevitable impurities, a layer comprising one type or two types of the γ phase and the γ' phase having a composition that is thermodynamically equilibrated with the Ni-based superalloy is coated in one layer or in a multilayer.

The invention is sixthly characterized in that, to an Ni-based superalloy having a composition containing Al: not less than 5.0 wt % to not more than 7.0 wt %, Ta: not less than 4.0 wt % to not more than 8.0 wt %, Mo: not less than 1.0 wt % to not more than 4.5 wt %, W: not less than 4.0 wt % to not more than 8.0 wt %, Re: not less than 3.0 wt % to not more than 6.0 wt %, Hf: not less than 0.01 wt % to not more than 0.50 wt %, Cr: not less than 2.0 wt % to not more than 10.0 wt %, Co: not less than 0.1 wt % to not more than 15.0 wt %, Ru: not less than 1.0 wt % to not more than 4.0 wt %, Nb: not less than 0 wt % to not more than 2.0 wt %, and the remains consisting of Ni and inevitable impurities, a layer comprising one type or two types of the γ phase and the γ' phase having a composition that is thermodynamically equilibrated with the Ni-based superalloy is coated in one layer or in a multilayer.

The invention is seventhly characterized in that, to an Ni-based superalloy having a composition containing Al: not less than 5.5 wt % to not more than 6.5 wt %, Ta: not less than 5.0 wt % to not more than 7.0 wt %, Mo: not less than 1.0 wt % to not more than 4.0 wt %, W: not less than 4.0 wt % to not more than 7.0 wt %, Re: not less than 4.0 wt % to not more than 5.5 wt %, Ti: not less than 0 wt % to not more than 2.0 wt %, Nb: not less than 0 wt % to not more than 2.0 wt %, Hf: not less than 0 wt % to not more than 0.50 wt %, V: not less than 0 wt % to not more than 0.50 wt %, Cr: not less than 0.1 wt % to not more than 4.0 wt %, Co: not less than 7.0 wt % to not more than 15.0 wt %, Si: not less than 0.01 wt % to not more than 0.1 wt %, and the remains consisting of Ni and inevitable impurities, a layer comprising one type or two types of the γ phase and the γ' phase having a composition that is thermodynamically equilibrated with the Ni-based superalloy is coated in one layer or in a multilayer.

The invention is eighthly characterized in that, to an Ni-based superalloy having a composition containing Al: not less than 4.5 wt % to not more than 6.0 wt %, Ta: not less than 5.0 wt % to not more than 8.0 wt %, Mo: not less than 0.5 wt % to not more than 3.0 wt %, W: not less than 7.0 wt % to not more than 10.0 wt %, Re: not less than 1.0 wt % to not more than 3.0 wt %, Ti: not less than 0.1 wt % to not more than 2.0 wt %, Hf: not less than 0.01 wt % to not more than 0.50 wt %, Cr: not less than 3.5 wt % to not more than 5.0 wt %, Co: not less than 4.0 wt % to not more than 11.0 wt %, Si: not less than 0.01 wt % to not more than 0.1 wt %, and the remains consisting of Ni and inevitable impurities, a layer comprising one type or two types of the γ phase and the γ' phase having a composition that is thermodynamically equilibrated with the Ni-based superalloy is coated in one layer or in a multilayer.

The invention is ninthly characterized in that, to an Ni-based superalloy having a composition containing Al: not less than 5.1 wt % to not more than 6.1 wt %, Ta: not less than 4.5 wt % to not more than 6.1 wt %, Mo: not less than 2.1 wt % to not more than 3.3 wt %, W: not less than 4.1 wt % to not more than 7.1 wt %, Re: not less than 6.4 wt % to not more than 7.4 wt %, Ti: not less than 0 wt % to not more than 0.5 wt %, Hf: not less than 0 wt % to not more than 0.50 wt %, Cr: not less than 2.5 wt % to not more than 7.0 wt %, Co: not less than 5.1 wt % to not more than 6.1 wt %, Ru: not less than 4.5 wt % to not more than 5.5 wt %, Nb: not less than 0 wt % to not more than 1.0 wt %, and the remains consisting of Ni and inevitable impurities, an alloy layer having a composition containing Al: not less than 6.8 wt % to not more than 8.8 wt %, Ta: not less than 7.0 wt % to not more than 9.0 wt %, Mo: not less than 0.5 wt % to not more than 2.0 wt %, W: not less than 3.3 wt % to not more than 6.3 wt %, Re: not less than 1.6 wt % to not more than 3.6 wt %, Ti: not less than 0 wt % to not more than 1.5 wt %, Hf: not less than 0 wt % to not more than 1.15 wt %, Cr: not less than 0.5 wt % to not more than 6.0 wt %, Co: not less than 3.2 wt % to not more than 5.2 wt %, Ru: not less than 2.9 wt % to not more than 4.9 wt %, Nb: not less than 0 wt % to not more than 1.5 wt %, and the remains consisting of Ni and inevitable impurities is coated.

The invention is tenthly characterized in that, to an Ni-based superalloy having a composition containing Al: not less than 5.3 wt % to not more than 6.3 wt %, Ta: not less than 5.3 wt % to not more than 6.3 wt %, Mo: not less than 2.4 wt % to not more than 4.4 wt %, W: not less than 4.3 wt % to not more than 6.3 wt %, Re: not less than 4.4 wt % to not more than 5.4 wt %, Ti: not less than 0 wt % to not more than 0.5 wt %, Hf: not less than 0 wt % to not more than 0.50 wt %, Cr: not less than 2.5 wt % to not more than 7.0 wt %, Co: not less than 5.3 wt % to not more than 6.3 wt %, Ru: not less than 5.5 wt % to not more than 6.5 wt %, Nb: not less than 0 wt % to not more than 1.0 wt %, and the remains consisting of Ni and inevitable impurities, an alloy layer having a composition containing Al: not less than 6.1 wt % to not more than 8.1 wt %, Ta: not less than 4.8 wt % to not more than 6.8 wt %, Mo: not less than 1.9 wt % to not more than 3.9 wt %, W: not less than 3.8 wt % to not more than 6.8 wt %, Re: not less than 1.4 wt % to not more than 3.4 wt %, Ti: not less than 0 wt % to not more than 1.5 wt %, Hf: not less than 0 wt % to not more than 1.15 wt %, Cr: not less than 1.3 wt % to not more than 6.0 wt %, Co: not less than 4.0 wt % to not more than 6.0 wt %, Ru: not less than 4.2 wt % to not more than 6.2 wt %, Nb: not less than 0 wt % to not more than 1.5 wt %, and the remains consisting of Ni and inevitable impurities is coated.

The invention is eleventhly characterized in that, to an Ni-based superalloy having a composition containing Al: not less than 5.2 wt % to not more than 6.2 wt %, Ta: not less than 5.1 wt % to not more than 6.1 wt %, Mo: not less than 2.1 wt % to not more than 3.3 wt %, W: not less than 4.1 wt % to not more than 6.1 wt %, Re: not less than 5.3 wt % to not more than 6.3 wt %, Ti: not less than 0 wt % to not more than 0.5 wt %, Hf: not less than 0 wt % to not more than 0.50 wt %, Cr: not less than 2.7 wt % to not more than 7.0 wt %, Co: not less than 5.3 wt % to not more than 6.3 wt %, Ru: not less than 3.1 wt % to not more than 4.1 wt %, Nb: not less than 0 wt % to not more than 1.0 wt %, and the remains consisting of Ni and inevitable impurities, an alloy layer having a composition containing Al: not less than 7.1 wt % to not more than 9.1 wt %, Ta: not less than 7.2 wt % to not more than 9.2 wt %, Mo: not less than 0.5 wt % to not more than 2.5 wt %, W: not less than 3.3 wt % to not more than 6.3 wt %, Re: not less than 1.1 wt % to not more than 3.1 wt %, Ti: not less than 0 wt % to not more than 1.5 wt %, Hf: not less than 0 wt % to not more than 1.15 wt %, Cr: not less than 0.6 wt % to not more than 6.0 wt %, Co: not less than 3.3 wt % to not more than 5.3 wt %, Ru: not less than 1.8 wt % to not more than 3.8 wt %, Nb: not less than 0 wt % to not more than 1.5 wt %, and the remains consisting of Ni and inevitable impurities is coated.

The invention is twelfthly characterized in that, to an Ni-based superalloy having a composition containing Al: not less than 5.4 wt % to not more than 6.4 wt %, Ta: not less than 5.1 wt % to not more than 6.1 wt %, Mo: not less than 2.1 wt % to not more than 3.3 wt %, W: not less than 4.4 wt % to not more than 6.4 wt %, Re: not less than 4.5 wt % to not more than 5.5 wt %, Ti: not less than 0 wt % to not more than 0.5 wt %, Hf: not less than 0 wt % to not more than 0.50 wt %, Cr: not less than 2.7 wt % to not more than 7.0 wt %, Co: not less than 5.3 wt % to not more than 6.3 wt %, Ru: not less than 4.5 wt % to not more than 5.5 wt %, Nb: not less than 0 wt % to not more than 1.0 wt %, and the remains consisting of Ni and inevitable impurities, an alloy layer having a composition containing Al: not less than 7.3 wt % to not more than 9.3 wt %, Ta: not less than 7.2 wt % to not more than 9.2 wt %, Mo: not less than 0.5 wt % to not more than 2.5 wt %, W: not less than 3.5 wt % to not more than 6.5 wt %, Re: not less than 0.8 wt % to not more than 1.3 wt %, Ti: not less than 0 wt % to not more than 1.5 wt %, Hf: not less than 0 wt % to not more than 1.15 wt %, Cr: not less than 0.6 wt % to not more than 6.0 wt %, Co: not less than 3.3 wt % to not more than 5.3 wt %, Ru: not less than 0.5 wt % to not more than 2.5 wt %, Nb: not less than 0 wt % to not more than 1.5 wt %, and the remains consisting of Ni and inevitable impurities is coated.

The invention is thirteenthly characterized in that, to an Ni-based superalloy having a composition containing Al: not less than 5.5 wt % to not more than 6.5 wt %, Ta: not less than 5.5 wt % to not more than 6.5 wt %, Mo: not less than 1.5 wt % to not more than 2.5 wt %, W: not less than 5.5 wt % to not more than 6.5 wt %, Re: not less than 4.5 wt % to not more than 5.5 wt %, Ti: not less than 0 wt % to not more than 0.5 wt %, Hf: not less than 0 wt % to not more than 0.50 wt %, Cr: not less than 2.5 wt % to not more than 3.5 wt %, Co: not less than 11.5 wt % to not more than 12.5 wt %, Nb: not less than 0 wt % to not more than 1.0 wt %, and the remains consisting of Ni and inevitable impurities, an alloy layer having a composition containing Al: not less than 7.5 wt % to not more than 9.5 wt %, Ta: not less than 8.3 wt % to not more than 10.3 wt %, Mo: not less than 0 wt % to not more than 2.0 wt %, W: not less than 4.8 wt % to not more than 6.8 wt %, Re: not less than 0.6 wt % to not more than 1.8 wt %, Ti: not less than 0 wt % to not more than 1.5 wt %, Hf: not less than 0 wt % to not more than 1.15 wt %, Cr: not less than 0.4 wt % to not more than 2.4 wt %, Co: not less than 8.2 wt % to not more than 10.2 wt %, Nb: not less than 0 wt % to not more than 1.5 wt %, and the remains consisting of Ni and inevitable impurities is coated.

The invention is fourteenthly characterized in that, to an Ni-based superalloy having a composition containing Al: not less than 4.8 wt % to not more than 5.8 wt %, Ta: not less than 5.5 wt % to not more than 6.5 wt %, Mo: not less than 1.4 wt % to not more than 2.4 wt %, W: not less than 8.2 wt % to not more than 9.2 wt %, Re: not less than 1.6 wt % to not more than 2.6 wt %, Ti: not less than 0 wt % to not more than 2.0 wt %, Nb: not less than 0 wt % to not more than 2.0 wt %, Hf: not less than 0 wt % to not more than 0.50 wt %, Cr: not less than 4.4 wt % to not more than 5.4 wt %, Co: not less than 7.3 wt % to not more than 8.3 wt %, and the remains consisting of Ni and inevitable impurities, an alloy layer having a composition containing Al: not less than 6.9 wt % to not more than 8.9 wt %, Ta: not less than 8.5 wt % to not more than 10.5 wt %, Mo: not less than 0 wt % to not more than 1.9 wt %, W: not less than 6.2 wt % to not more than 8.2 wt %, Re: not less than 0 wt % to not more than 1.5 wt %, Ti: not less than 0 wt % to not more than 1.7 wt %, Hf: not less than 0 wt % to not more than 1.15 wt %, Cr: not less than 0.4 wt % to not more than 2.4 wt %, Co: not less than 3.7 wt % to not more than 5.7 wt %, Nb: not less than 0 wt % to not more than 1.5 wt %, and the remains consisting of Ni and inevitable impurities is coated.

The invention is fifteenthly characterized in that the coating layer comprises one type or plural types of Si, Y, La, Ce and Zr in not less than 0 wt % to not more than 1.0 wt %.

The invention is sixteenthly characterized in that the coating layer does not comprise one type or plural types of Ru, Ta, Mo, W and Re.

The invention is seventeenthly characterized in that Al contained in the coating layer is thermodynamically equilibrated with the Ni-based superalloy.

The invention is eighteenthly characterized in that the surface of the coating layer is coated with ceramic.

The invention is nineteenthly characterized in that an alloy layer having a composition containing Al: not less than 6.1 wt % to not more than 10.6 wt %, Ta: not less than 0 wt % to not more than 10.5 wt %, Mo: not less than 0 wt % to not more than 3.9 wt %, W: not less than 0 wt % to not more than 8.2 wt %, Re: not less than 0 wt % to not more than 3.4 wt %, Ti: not less than 0 wt % to not more than 1.7 wt %, Hf: not less than 0 wt % to not more than 1.15 wt %, Cr: not less than 0.4 wt % to not more than 4.0 wt %, Co: not less than 3.2 wt % to not more than 10.2 wt %, Ru: not less than 0 wt % to not more than 6.2 wt %, Nb: not less than 0 wt % to not more than 1.5 wt %, Si: not less than 0 wt % to not more than 1.0 wt %, Y: not less than 0 wt % to not more than 1.0 wt %, La: not less than 0 wt % to not more than 1.0 wt %, Ce: not less than 0 wt % to not more than 1.0 wt %, Zr: not less than 0 wt % to not more than 1.0 wt %, and the remains consisting of Ni and inevitable impurities is coated.

Advantage of the Invention

According to the first heat resistant materials of the present invention, by coating a material in thermodynamical equilibrium state with an Ni-based superalloy to be a substrate to the Ni-based superalloy, it is possible to prevent interdiffusion of elements through the substrate/coating interface even at such high temperatures as 1100° C. or above 1100° C., and to improve dramatically the durability for a long period of time at high temperatures.

According to the second heat resistant material of the invention, each of the γ phase, the γ' phase and the B2 phase having a composition that is thermodynamically equilibrated with an Ni-based superalloy to be a substrate is a phase for which the improvement in oxidation resistance, high-temperature corrosion resistance and mechanical properties are expected, therefore an excellent heat resistant material can be obtained.

According to the third heat resistant material of the invention, the Ni-based superalloy having a predetermined composition range to be a substrate exhibits excellent properties for a heat resistant material, therefore a heat resistant material excellent in high-temperature durability can be obtained.

According to the fourth heat resistant material of the invention, the Ni-based superalloy having a predetermined composition range to be a substrate is one that is suitable for a so-called single crystal alloy and exhibits excellent properties for a heat resistant material, therefore a heat resistant material excellent in high-temperature durability can be obtained.

According to the fifth to eighth heat resistant materials of the invention, the Ni-based superalloys having a predetermined composition range to be a substrate achieve a single crystal alloy excellent in creep property, and thus exhibit excellent properties for a heat resistant material, therefore a heat resistant material excellent in high-temperature durability can be obtained.

According to the ninth to fourteenth heat resistant materials of the invention, the Ni-based superalloys having a predetermined composition range to be a substrate are a single crystal alloy further excellent in creep property, and the alloy to be coated is an alloy that exhibits thermodynamic equilibrium with the Ni-based superalloy and is, at the same time, excellent in oxidation resistance, therefore a heat resistant material excellent in high-temperature durability can be obtained.

According to the fifteenth heat resistant material of the invention, each of Si, Y, La, Ce and Zr contained in the coating layer improves the oxidation resistance of the coating layer. These elements give a little influence on the thermodynamic equilibrium, therefore the addition thereof does not degrade the high-temperature durability.

According to the sixteenth heat resistant material of the invention, Ru, Ta, Mo, W and Re that are expensive or give adverse effect on the oxidation resistance are not contained, therefore a coating layer that is inexpensive and has good oxidation resistance can be obtained. The elements that are contained in the coating layer are in the thermodynamic equilibrium state with the Ni-based superalloy to be a substrate, therefore a heat resistant material excellent in high-temperature durability can be obtained.

According to the seventeenth heat resistant material of the invention, by setting Al contained in the coating layer, which is an element having the highest diffusion speed and, in addition, causes to form an altered layer due to the diffusion, in the thermodynamic equilibrium with the Ni-based superalloy to be a substrate, a heat resistant material excellent in high-temperature durability can be obtained.

According to the eighteenth heat resistant material of the invention, due to a heat shielding effect of the ceramic, a heat resistant material excellent in high-temperature durability capable of the use at higher temperatures can be obtained.

According to the nineteenth heat resistant material of the invention, the interdiffusion of elements through the substrate/coating interface is prevented even at such high temperatures as 1100° C. or above 1100° C., to make it possible to improve dramatically the durability for a long period of time at high temperatures.

BEST MODE FOR CARRYING OUT THE INVETNION

Figure 1:
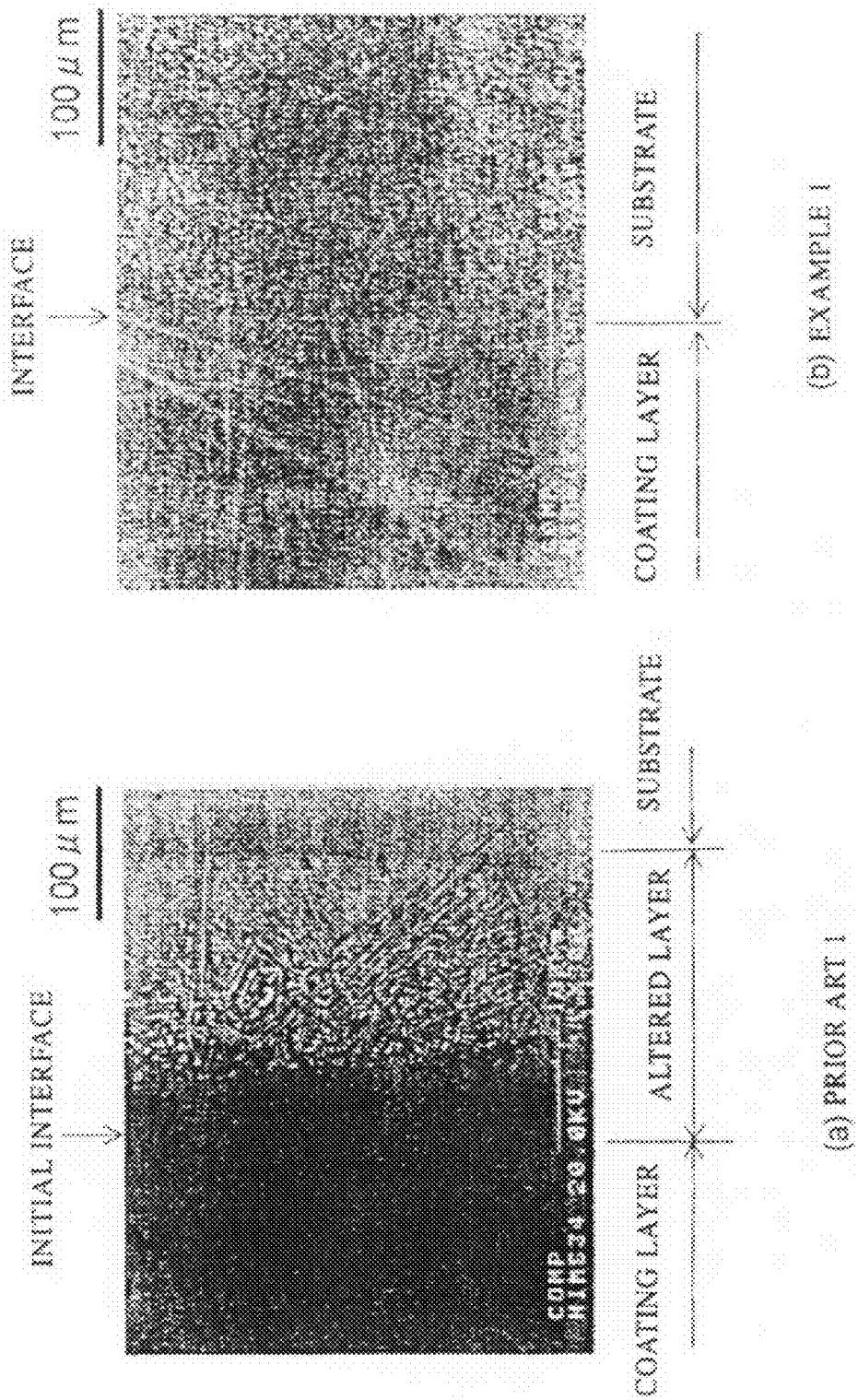
FIG. 1 is a microphotograph of the coating/substrate interface after a 1100° C.×300 H heat holding test on samples obtained in Prior Art 1 and in Example 1.

Hereinafter, while representing Examples, the heat resistant material of the present invention is described.

The heat resistant material of the invention is one prepared by coating one type or plural types of materials on an Ni-based superalloy, the material not generating interdiffusion between the Ni-based superalloy to be a substrate. Specifically, one in which a material that is in the thermodynamic equilibrium state with the substrate is coated. Consequently, the interdiffusion of elements through the substrate/coating interface is prevented even at such high temperature as 1100° C. or above 1100° C., and thus the heat resistant material of the invention can be used for a long period of time at dramatically high temperatures, as compared with conventional heat resistant materials. Upon forming it, such complicated coating process as is the case for conventional multilayer diffusion barrier coatings is not necessarily required, and the coating process is not particularly limited. In addition, differing from the coating of the γ+γ' phase containing Pt disclosed in the above-described Patent Document 2, in the heat resistant material of the invention, interdiffusion of elements through the interface hardly occurs. Therefore, stability is maintained for a long period of time and it is possible to coat the γ' phase, the β phase, or the γ'+β phase having Al in a high concentration on the Ni-based superalloy while maintaining the stability for a long period of time. The coating of the γ+γ' phase is also possible, and, in the heat resistant material of the invention in this instance also, since the coating layer is thermodynamically equilibrated with the Ni-based superalloy to be a substrate, interdiffusion of elements hardly occurs even in the use at high temperatures for a long period of time.

The heat resistant material of the invention is thought to be suitable especially for the material for turbine blades of jet engines and gas turbines for the power generation, and holds the promise of practical application.

EXAMPLES

In Table 1, compositions of Ni-based superalloys used as a substrate are shown, and in Table 2, compositions of coating materials are shown. In the comment field of Table 2, the relation with the Ni-based superalloys as shown in Table 1 is shown.

TABLE 1

| | Chemical composition (wt %) | | | | | | | | | | |
|---|---|---|---|---|---|---|---|---|---|---|---|
| | Ni | Co | Cr | Mo | W | Al | Ti | Ta | Hf | Re | Ru |
| TMS-82+ | Bal. | 7.8 | 4.9 | 1.9 | 8.7 | 5.3 | 0.5 | 6.0 | 0.10 | 2.1 | — |
| TMS-75 | Bal. | 12.0 | 3.0 | 2.0 | 6.0 | 6.0 | — | 6.0 | 0.10 | 5.0 | — |
| TMS-138 | Bal. | 5.8 | 3.2 | 2.8 | 5.9 | 5.9 | — | 5.6 | 0.10 | 5.0 | 2.0 |
| TMS-138A | Bal. | 5.8 | 3.2 | 2.8 | 5.6 | 5.7 | — | 5.6 | 0.10 | 5.8 | 3.6 |
| TMS-162 | Bal. | 5.8 | 2.9 | 3.9 | 5.8 | 5.8 | — | 5.8 | 0.10 | 4.9 | 6.0 |
| TMS-173 | Bal. | 5.6 | 2.8 | 2.8 | 5.6 | 5.6 | — | 5.6 | 0.10 | 6.9 | 5 |
| Ni-14Cr-9.6Al | Bal. | — | 14.0 | — | — | 9.6 | — | — | — | — | — |

TABLE 2

| | Chemical composition (wt %) | | | | | | | | | | | |
|---|---|---|---|---|---|---|---|---|---|---|---|---|
| | Ni | Co | Cr | Mo | W | Al | Ti | Ta | Hf | Re | Ru | Comment |
| Coating 1 | Bal. | 10.5 | 7.6 | 2.6 | 10.0 | 2.9 | 0.2 | 3.4 | 0.03 | 4.2 | — | γ equilibrated with TMS-82+ |
| Coating 2 | Bal. | 4.7 | 1.4 | 0.9 | 7.2 | 7.9 | 0.7 | 9.5 | 0.16 | 0.5 | — | γ' equilibrated with TMS-82+ |

TABLE 2-continued

| | Ni | Co | Cr | Mo | W | Al | Ti | Ta | Hf | Re | Ru | Comment |
|---|---|---|---|---|---|---|---|---|---|---|---|---|
| Coating 3 | Bal. | 9.2 | 1.4 | 1.0 | 5.8 | 8.5 | — | 6.0 | 0.10 | 5.0 | — | γ' equilibrated with TMS-75 |
| Coating 4 | Bal. | 4.3 | 1.6 | 1.5 | 5.5 | 8.3 | — | 8.2 | 0.15 | 1.8 | 1.5 | γ' equilibrated with TMS-138 |
| Coating 5 | Bal. | 4.3 | 1.6 | 1.5 | 5.3 | 8.1 | — | 8.2 | 0.18 | 2.1 | 2.8 | γ' equilibrated with TMS-138A |
| Coating 6 | Bal. | 5.0 | 2.3 | 2.6 | 5.8 | 7.1 | — | 7.1 | 0.12 | 2.4 | 5.2 | γ' equilibrated with TMS-162 |
| Coating 7 | Bal. | 4.2 | 1.5 | 1.5 | 5.3 | 7.8 | — | 8.0 | 0.15 | 2.6 | 3.9 | γ' equilibrated with TMS-173 |
| Coating 8 | Bal. | — | 5.0 | — | — | 10.0 | — | — | — | — | — | γ' in which Al is equilibrated with TMS-173 |
| Coating 9 | Bal. | — | 5.0 | — | — | 10.0 | — | 3.0 | — | — | — | γ' in which Al is equilibrated with TMS-173 |
| Coating 10 | Bal. | — | — | — | — | 12.7 | — | — | — | — | — | γ' in which Al is equilibrated with TMS-173 |
| Coating 11 | Bal. | — | 8.5 | — | — | 16.0 | — | — | — | — | — | β+γ equilibrated with Ni-14Cr-9.6Al |
| Coating 12 | Bal. | — | 8.4 | — | — | 11.4 | — | — | — | — | — | γ' equilibrated with Ni-14Cr-9.6Al |
| Coating 13 | Bal. | — | 19.6 | — | — | 7.8 | — | — | — | — | — | γ equilibrated with Ni-14Cr-9.6Al |
| Coating 14 | Bal. | — | 8.4 | — | — | 13.7 | — | — | — | — | — | β + γ' equilibrated with Ni-14Cr-9.6Al |
| Coating 15 | Bal. | — | 12.1 | — | — | 11.7 | — | — | — | — | — | β + γ + γ' equilibrated with Ni-14Cr-9.6Al |
| MCrAlY | Bal. | — | 22.0 | — | — | 10.0 | — | — | — | — | — | Prior coating (β + γ) |
| CoNiCrAlY | Bal. | 38.5 | 21.0 | — | — | 8.0 | — | — | — | — | — | Prior coating (β + γ) |
| Ni—Al | Bal. | — | — | — | — | 32.0 | — | — | — | — | — | Prior coating (β) |

A coating material having respective ingredients was molten and manufactured by arc melting under Ar atmosphere followed by homogenizing treatment at 1250° C. for 10 hours, from which a test piece having a diameter of 10 mm and a thickness of 5 mm was cut off. As to a substrate, a single crystal alloy rod (φ 10×130 mm) was cast by a unidirectional solidification method in vacuum followed by solution heat treatment, from which a test piece having a diameter of 10 mm and a thickness of 5 mm was cut off. Each of the coating material and the substrate thus cut off was subjected to surface polishing, which was then used for forming a diffusion couple of the substrate and the coating material. The couple was subjected to diffusion heat treatment at 1100° C. for 300 hours in the air to examine the diffusion behavior. After the test, the cross-section of the diffusion couple was observed with an electron microscope (SEM) to measure the thickness of an altered layer. In Table 3, the results of the thickness measurement for the altered layer are shown. For a portion of samples, in addition, the diffusion state of the element was analyzed with an electron probe microanalyzer (EPMA). Further, a 1-hour cycle repetitive test was conducted at 1100° C. in the air.

TABLE 3

| | Coating | Substrate | Thickness of altered layer |
|---|---|---|---|
| Example 1 | Coating 1 | TMS-B2+ | not more than 1 μm |
| Example 2 | Coating 2 | TMS-B2+ | not more than 1 μm |
| Example 3 | Coating 3 | TMS-75 | not more than 1 μm |
| Example 4 | Coating 4 | TMS-138 | not more than 1 μm |
| Example 5 | Coating 5 | TMS-138A | not more than 1 μm |
| Example 6 | Coating 6 | TMS-162 | not more than 1 μm |
| Example 7 | Coating 7 | TMS-173 | not more than 1 μm |
| Example 8 | Coating 8 | TMS-173 | 10 μm |
| Example 9 | Coating 9 | TMS-173 | 5 μm |
| Example 10 | Coating 10 | TMS-173 | 14 μm |
| Example 11 | Coating 11 | Ni-14Cr-9.6Al | not more than 1 μm |
| Example 12 | Coating 12 | Ni-14Cr-9.6Al | not more than 1 μm |
| Example 13 | Coating 13 | Ni-14Cr-9.6Al | not more than 1 μm |
| Example 14 | Coating 14 | Ni-14Cr-9.6Al | not more than 1 μm |
| Example 15 | Coating 15 | Ni-14Cr-9.6Al | not more than 1 μm |
| Prior Art 1 | MCrAlY | TMS-173 | 123 μm |
| Prior Art 2 | CoNiCrAlY | TMS-173 | 173 μm |
| Prior Art 3 | CoNiCrAlY | TMS-138 | 160 μm |
| Prior Art 4 | Ni—Al | TMS-138 | 129 μm |

As is clear from Table 3, it can be found that the thickness of the altered layer decreases dramatically in Examples when compared with Prior Arts. Examples 1 to 6 and Examples 11 to 15 are representative of the coating in which all elements are in the thermodynamic equilibrium, in which the altered layer had such small thickness as not more than 1 μm and was hardly observed. Examples 8 to 10 are representative of the coating from which such expensive elements as Ru, Ta, Mo, W and Re are eliminated and in which Al, which has the highest diffusion rate and causes to form the altered layer, is thermodynamically equilibrated with the Ni-based superalloy being the substrate. In Examples 8 to 10 also, dramatic decrease in the altered layer is confirmed when compared with Prior Arts.

Figure 2:
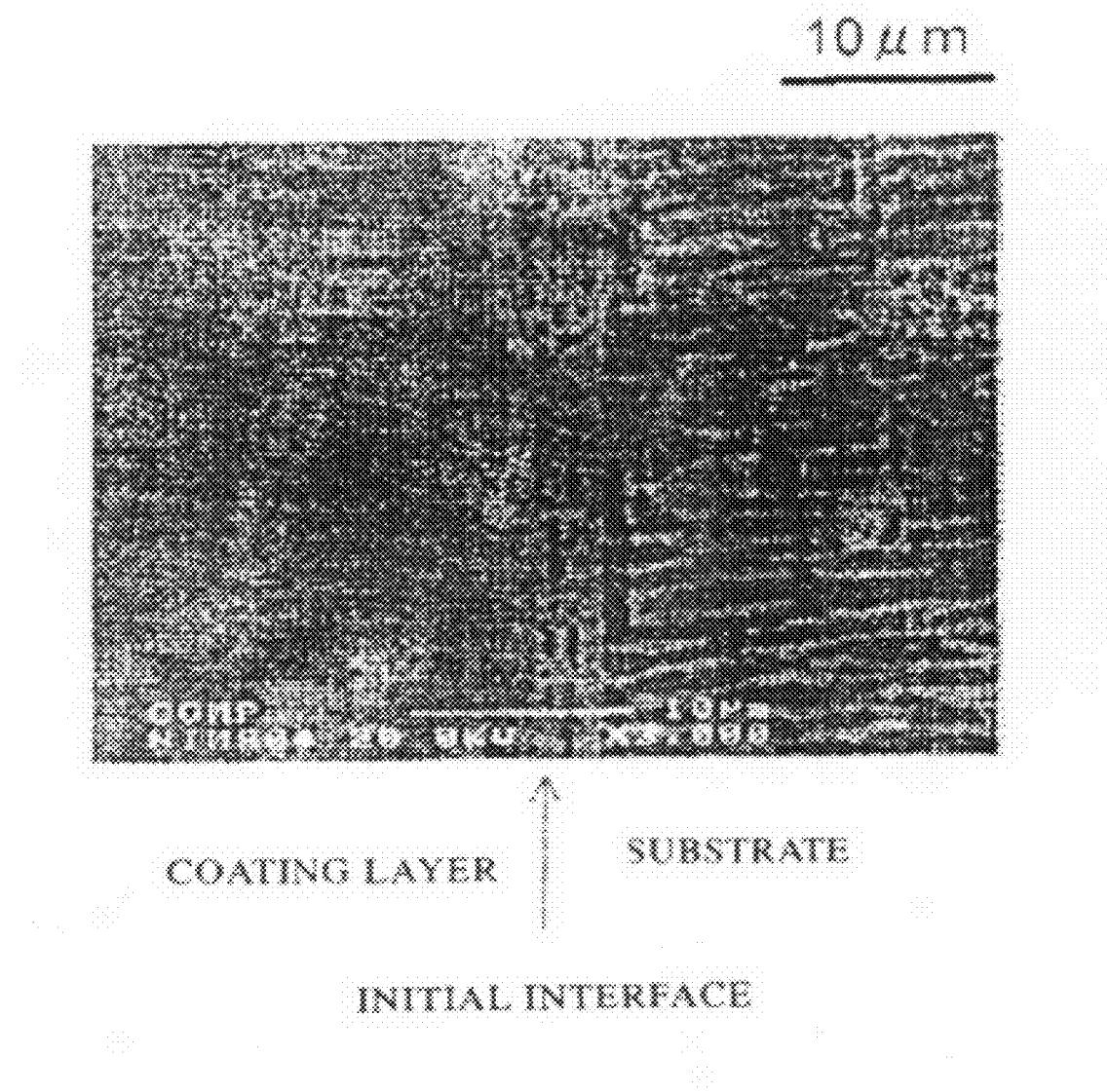
FIG. 2 is an enlarged photograph of the sample in Example 1 as shown in FIG. 1.

In FIG. 1, microphotographs of the coating/substrate interface after a 1100° C.×300 H heat holding test on samples obtained in Prior Art 1 and Example 1 are shown. In FIG. 2, an enlarged photograph for the sample of Example 1 is shown. In contrast to the generation of an altered layer having a thickness of 123 μm in Prior Art 1, no altered layer generates in Example 1.

Figure 3:
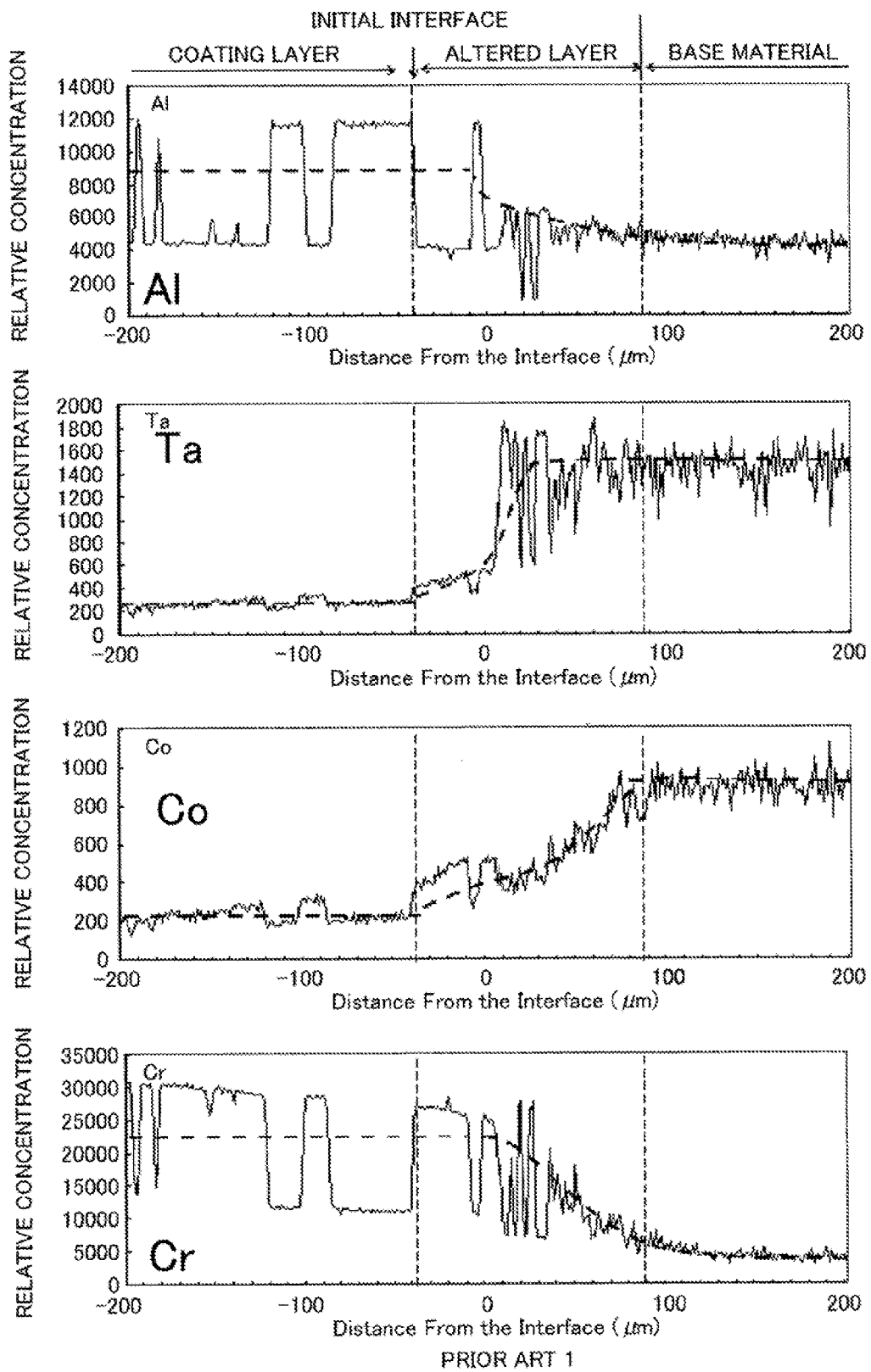
FIGS. 3 and 3A are drawings showing the analysis results of elements for the coating/substrate interface after a 1100° C.×300 H heat holding test on samples obtained in the Prior Art 1 and in Example 1 with EPMA.
Figure 3A:
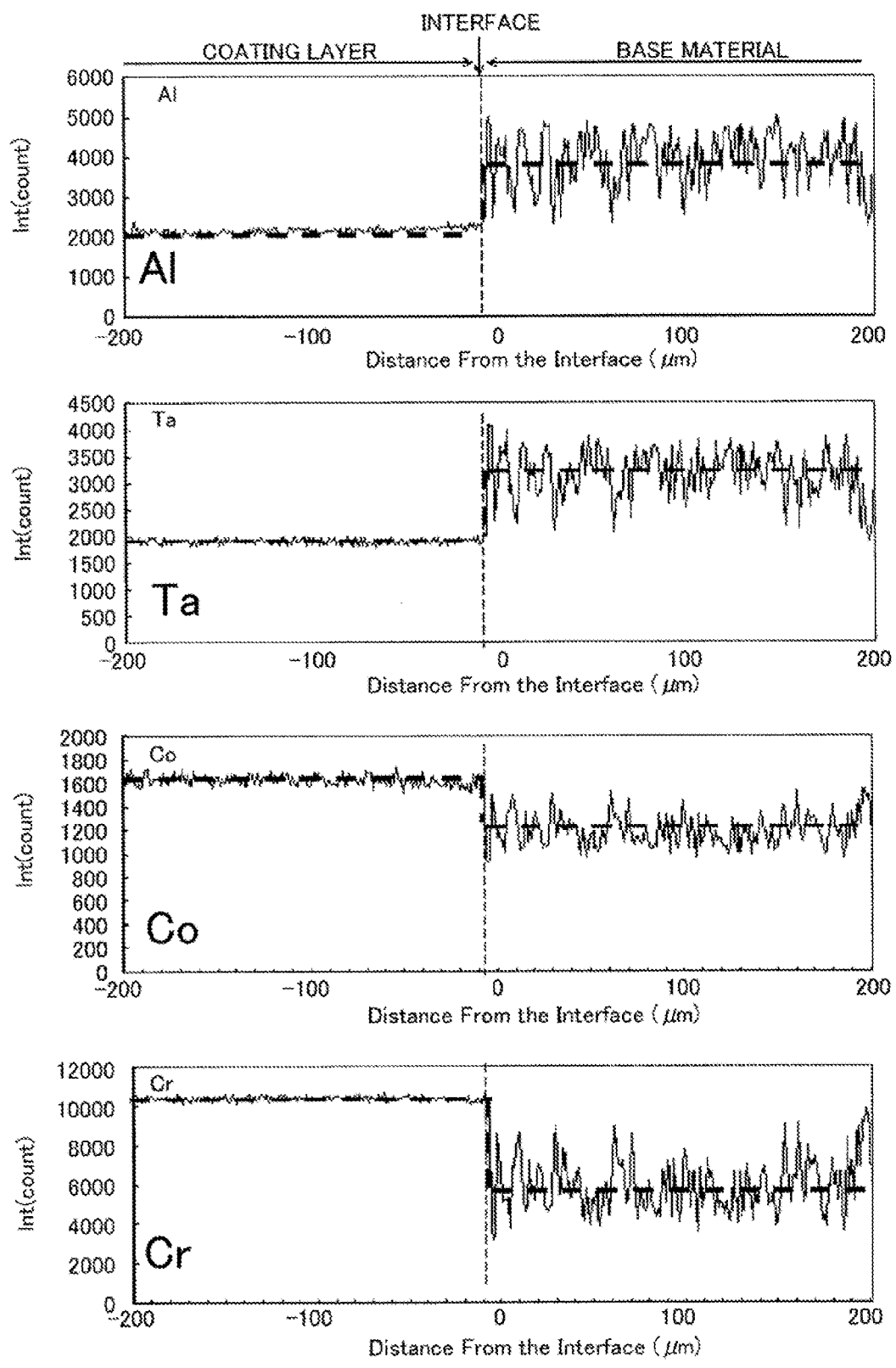

In FIG. 3, there are shown the results of element analysis for the coating/substrate interface with EPMA after subjecting samples obtained in Prior Art 1 and Example 1 to a 1100° C.×300 H heat holding test. It can be found also from the element analysis that, in Prior Art 1, the diffusion at the coating/substrate interface occurred in a range of 123 μm to generate an altered layer, but that, in Example 1, no diffusion of elements occurs at all.

Figure 4:
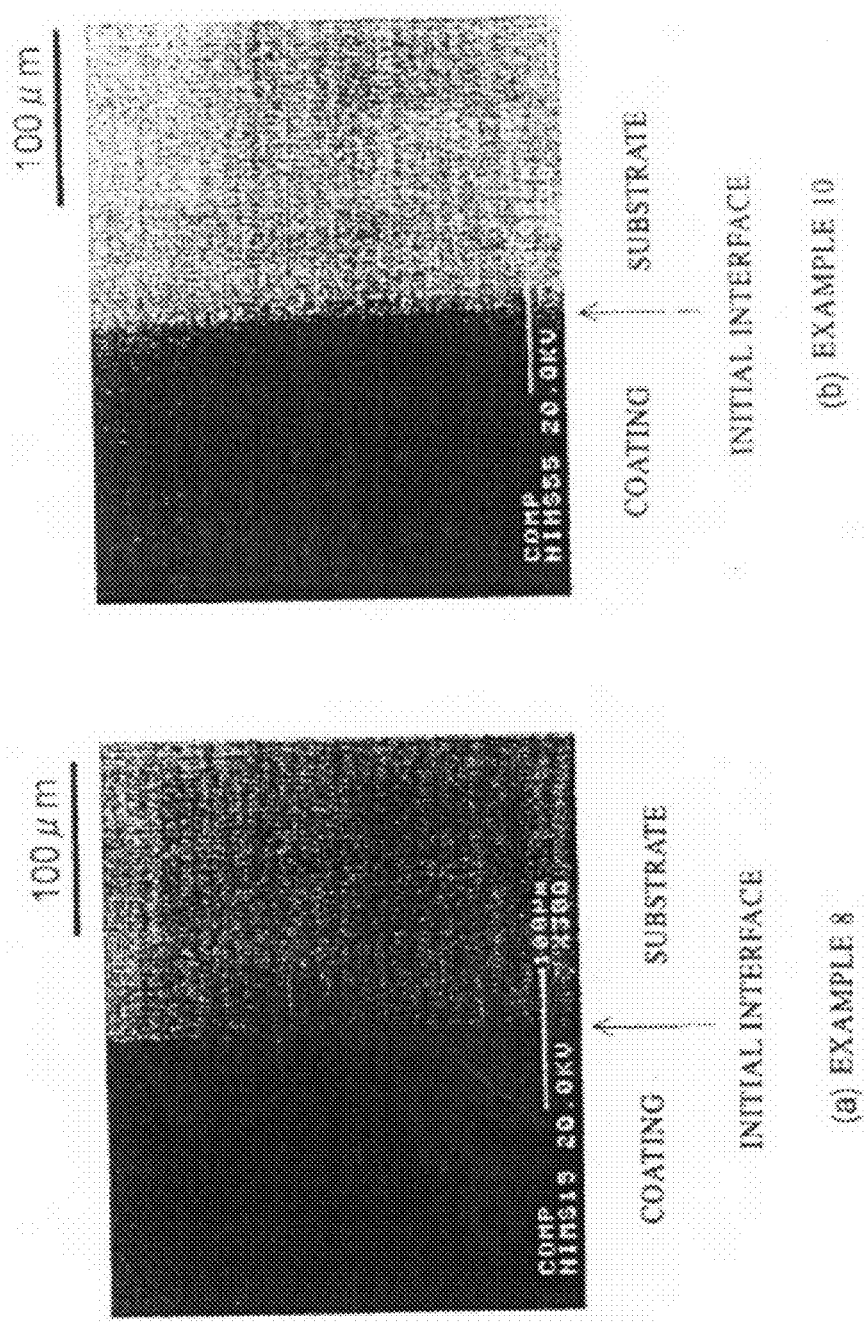
FIG. 4 is a microphotograph of the coating/substrate interface after a 1100° C.×300 H heat holding test on samples obtained in Examples 8 and 10.
Figure 5:
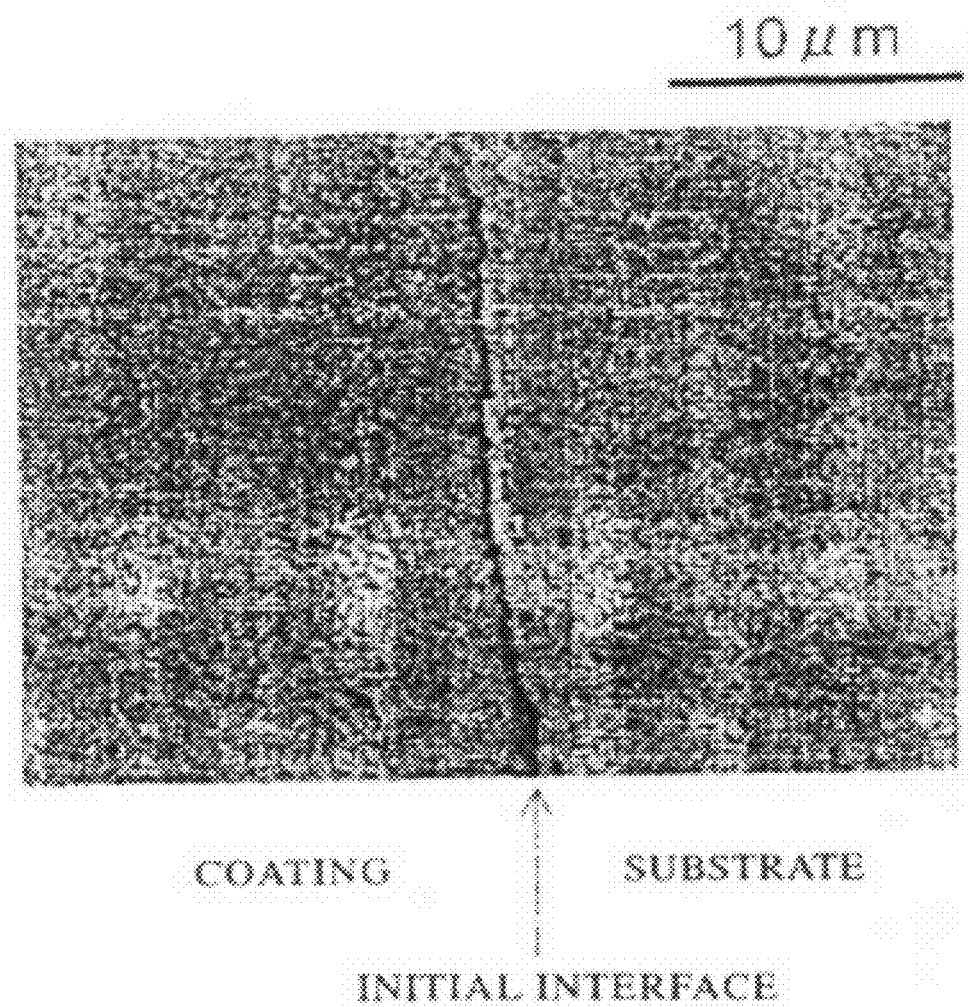
FIG. 5 is a microphotograph of the coating/substrate interface after a 1100° C.×300 H heat holding test on a sample obtained in Example 11.

In FIG. 4, microphotographs of the coating/substrate interface after a 1100° C.×300 H heat holding test on samples obtained in Examples 8 and 10 are shown. In FIG. 5, a similar microphotograph of a sample obtained in Example 11 is shown. As is clear from FIGS. 4 and 5, it can be found that the altered layer decreases dramatically in Examples 8, 10 and 11.

Figure 6:
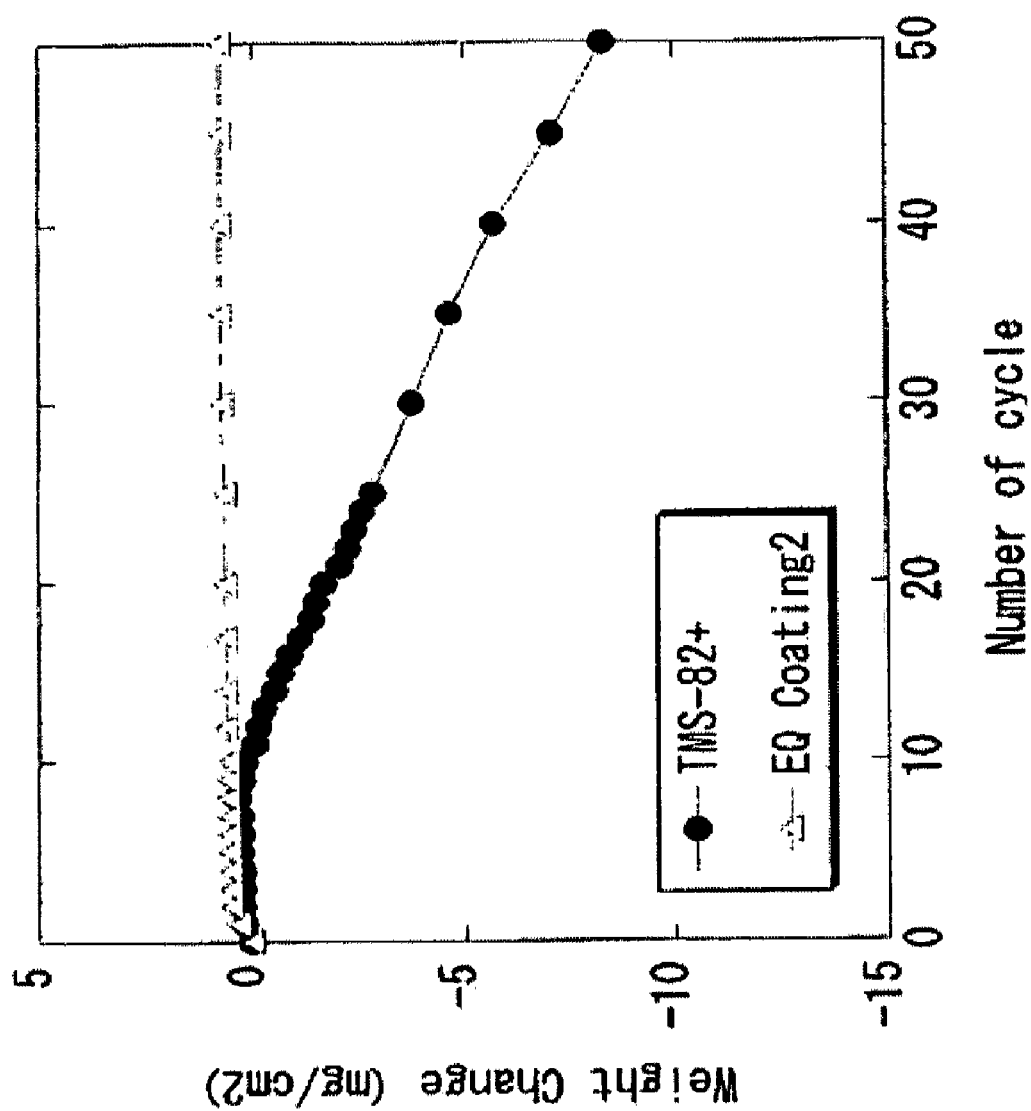
FIG. 6 is a drawing showing the result of a 1100° C.×1 H cycle oxidation test on a sample obtained in Example 2 while comparing with that on an Ni-based superalloy used for a substrate.

In FIG. 6, the result of a 1100° C.×1 H cycle oxidation test on a sample obtained in Example 2 is shown while comparing with an Ni-based superalloy used for a substrate. It can be said that the sample obtained in Example 2 exhibits excellent oxidation resistance as compared with the substrate, satisfies both the oxidation resistance and stability, and is a heat resistant material having a remarkably excellent high-temperature durability.

In Tables 4 and 5, the composition of another Ni-based superalloy substrate, and the composition of the coating material are shown. Each of them is shown in wt %. As well as the Ni-based superalloy substrate as shown in Table 1, Ni-based superalloy substrate as shown in Table 4 were coated with coating materials as shown in Table 5, which were subjected to a 1100° C.×300 H heat holding, and then the thickness of the altered layers were measured. The results are shown in Table 6.

For Examples 16 to 23, 32 and 33, in the same way as in Examples 1 to 15, a diffusion couple of the substrate and the coating material was formed to be tested. For Examples 24 to 31 and Reference Examples 1 to 6, samples were formed as follows to be tested. Respective single crystal alloy rods (φ10×130 mm) of substrate having respective ingredients were cast by a unidirectional solidification method in vacuum, which were subjected to solution heat treatment and then the surface of which was polished up to emery paper #600. To the obtained substrate, respective coating materials were coated in about 50 μm with a low-pressure plasma spraying method, which were held at 1100° C. for 300 hours in the air. After the test, the cross-section was observed with an electron microscope (SEM) to measure the thickness of the altered layer at the coating/substrate interface.

TABLE 4

|          | Ni   | Co  | Cr  | Mo  | W   | Al  | Ti  | Ta  | Hf   | Re  | Ru | Nb  |
|----------|------|-----|-----|-----|-----|-----|-----|-----|------|-----|----|-----|
| Rene'N5  | Bal. | 8.0 | 7.0 | 2.0 | 5.0 | 6.2 | 0   | 7.0 | 0.2  | 3.0 | 0  | 0   |
| CMSX-10  | Bal. | 3.0 | 2.0 | 0.4 | 5.0 | 5.7 | 0.2 | 8.0 | 0.03 | 6.0 | 0  | 0.1 |
| TMS-196  | Bal. | 5.6 | 4.7 | 2.4 | 4.9 | 5.7 | 0   | 5.4 | 0.1  | 6.2 | 5  | 0   |
| TMS-1961 | Bal. | 5.6 | 4.7 | 2.4 | 4.9 | 5.7 | 0   | 4.7 | 0.1  | 6.2 | 5  | 0.5 |

TABLE 5

| Coating    | Ni   | Co   | Cr   | Mo  | W   | Al   | Ti  | Ta   | Hf   | Re  | Ru  | Nb  | Si  | Y    |
|------------|------|------|------|-----|-----|------|-----|------|------|-----|-----|-----|-----|------|
| Coating A  | Bal. | 4.2  | 1.5  | 1.5 | 5.3 | 7.8  | 0   | 8.0  | 0.15 | 2.6 | 3.9 | 0   | 1.0 | 0    |
| Coating B  | Bal. | 4.2  | 1.5  | 1.5 | 5.3 | 7.8  | 0   | 8.0  | 0.15 | 2.6 | 3.9 | 0   | 0.5 | 0    |
| Coating C  | Bal. | 4.2  | 1.5  | 1.5 | 5.3 | 7.8  | 0   | 8.0  | 0.15 | 2.6 | 3.9 | 0   | 0.1 | 0    |
| Coating D  | Bal. | 4.2  | 1.5  | 1.5 | 5.3 | 7.8  | 0   | 8.0  | 0.15 | 2.6 | 3.9 | 0   | 0   | 1.0  |
| Coating E  | Bal. | 4.2  | 1.5  | 1.5 | 5.3 | 7.8  | 0   | 8.0  | 0.15 | 2.6 | 3.9 | 0   | 0   | 0.5  |
| Coating F  | Bal. | 4.2  | 1.5  | 1.5 | 5.3 | 7.8  | 0   | 8.0  | 0.15 | 2.6 | 3.9 | 0   | 0   | 0.1  |
| Coating G  | Bal. | 4.2  | 1.5  | 1.5 | 5.3 | 7.8  | 0   | 6.7  | 0.15 | 2.6 | 3.9 | 0.4 | 0   | 0.5  |
| Coating H  | Bal. | 6.1  | 3.7  | 1.0 | 4.8 | 8.1  | 0   | 9.2  | 0.30 | 0   | 0   | 0   | 0   | 0.1  |
| Coating I  | Bal. | 6.1  | 4.0  | 1.0 | 4.5 | 8.3  | 0   | 9.7  | 0.30 | 0   | 0   | 0   | 0   | 0.5  |
| Coating J  | Bal. | 3.4  | 0.7  | 0.8 | 5.1 | 9.0  | 0   | 9.4  | 0.15 | 0   | 3.3 | 0   | 0   | 0.04 |
| Coating K  | Bal. | 5.4  | 0.9  | 1.1 | 3.7 | 10.6 | 0   | 5.0  | 0.15 | 0.6 | 5.1 | 0   | 0   | 0.04 |
| Coating L  | Bal. | 10.2 | 3.3  | 3.9 | 8.2 | 10.6 | 0   | 10.5 | 1.15 | 3.4 | 6.2 | 1.5 | 0   | 0    |
| Coating M  | Bal. | 3.2  | 0.4  | 0   | 0   | 6.1  | 0   | 0    | 0    | 0   | 0   | 0   | 0   | 0    |
| Amdry9954  | 32.0 | Bal. | 21.0 | 0   | 0   | 8.0  | 0   | 0    | 0    | 0   | 0   | 0   | 0   | 0.5  |

TABLE 6

| | Coating | Substrate | Thickness of altered layer |
|---|---|---|---|
| Example 16 | Coating A | TMS-173 | not more than 1 μm |
| Example 17 | Coating B | TMS-173 | not more than 1 μm |
| Example 18 | Coating C | TMS-173 | not more than 1 μm |
| Example 19 | Coating D | TMS-173 | not more than 1 μm |
| Example 20 | Coating E | TMS-173 | not more than 1 μm |
| Example 21 | Coating F | TMS-173 | not more than 1 μm |
| Example 22 | Coating F | TMS-1961 | 5 μm |
| Example 23 | Coating G | TMS-173 | not more than 1 μm |
| Example 24 | Coating H | Rene'N5 | not more than 1 μm |
| Example 25 | Coating H | TMS-138 | 20 μm |
| Example 26 | Coating H | TMS-138A | 20 μm |
| Example 27 | Coating H | TMS-173 | 25 μm |
| Example 28 | Coating H | TMS-196 | 25 μm |
| Example 29 | Coating H | CMSX-10 | 25 μm |
| Example 30 | Coating I | Rene'N5 | not more than 1 μm |
| Example 31 | Coating I | TMS-138A | 20 μm |
| Example 32 | Coating J | TMS-173 | 35 μm |
| Example 33 | Coating K | TMS-173 | 10 μm |
| Ref. Exam. 1 | Amdry9954 | Rene'N5 | 120 μm |
| Ref. Exam. 2 | Amdry9954 | TMS-138 | 160 μm |
| Ref. Exam. 3 | Amdry9954 | TMS-138A | 165 μm |
| Ref. Exam. 4 | Amdry9954 | TMS-173 | 174 μm |
| Ref. Exam. 5 | Amdry9954 | TMS-196 | 176 μm |
| Ref. Exam. 6 | Amdry9954 | CMSX-10 | 165 μm |

As is clear from Table 6, in Examples, the thickness of the altered layer is extremely reduced as compared with Reference Examples in which an existing coating material was coated. It can be confirmed that the diffusion at the coating/substrate interface is prevented.

Figure 7:
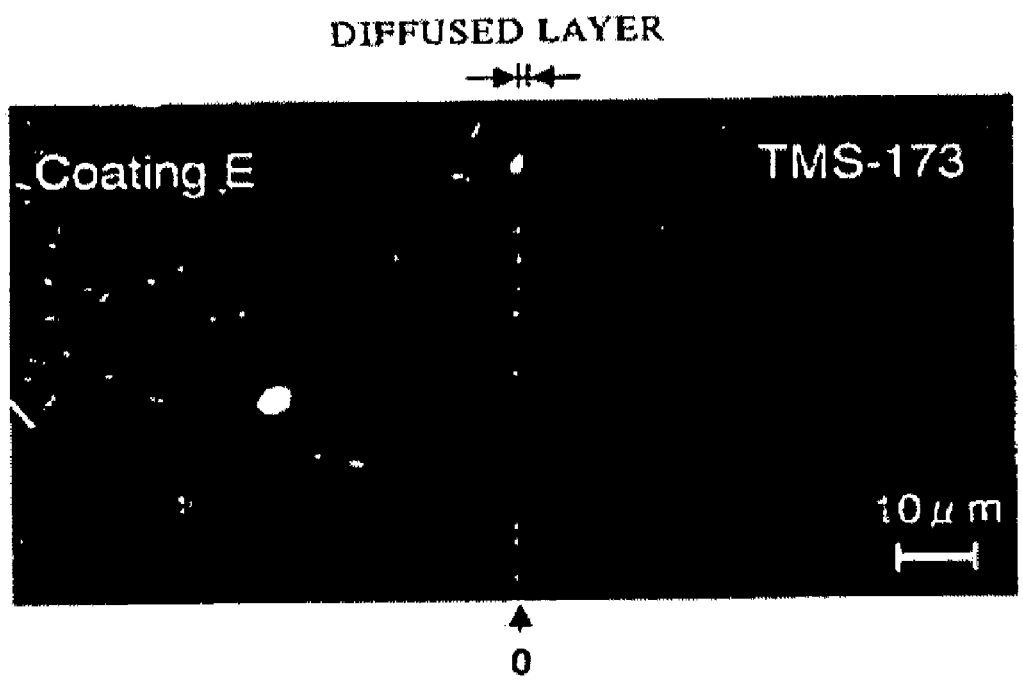
FIG. 7 is a microphotograph of the coating/substrate interface after a 1100° C.×300 H heat holding test on a sample obtained in Example 20.

In FIG. 7, a microphotograph of the coating/substrate interface of a sample obtained in Example 20 after a 1100° C.×300 H heat holding test is shown.

The invention claimed is:

1. A heat resistant material wherein
on an Ni-based superalloy having a composition containing Al: not less than 1.0 wt % to not more than 10.0 wt %, Ta: not less than 0 wt % to not more than 14.0 wt %, Mo: not less than 0 wt % to not more than 10.0 wt %, W: not less than 0 wt % to not more than 15.0 wt %, Re: not less than 0 wt % to not more than 10.0 wt %, Hf: not less than 0 wt % to not more than 3.0 wt %, Cr: not less than 0 wt % to not more than 20.0 wt %, Co: not less than 0 wt % to not more than 20 wt %, Ru: not less than 0 wt % to not more than 14.0 wt %, Nb: not less than 0 wt % to not more than 4.0 wt %, Si: not less than 0 wt % to not more than 2.0 wt %, and the remainder consisting of Ni and unavoidable impurities,
a coating material having a composition containing Al: not less than 6.1 wt % to not more than 10.6 wt %, Ta: not less than 0 wt % to not more than 10.5 wt %, Mo: not less than 0 wt % to not more than 3.9 wt %, W: not less than 0 wt % to not more than 8.2 wt %, Re: not less than 0 wt % to not more than 3.4 wt %, Ti: not less than 0 wt % to not more than 1.7 wt %, Hf: not less than 0 wt % to not more than 1.15 wt %, Cr: not less than 0.4 wt % to not more than 6.0 wt %, Co: not less than 3.2 wt % to not more than 10.2 wt %, Ru: not less than 0 wt % to not more than 6.2 wt %, Nb: not less than 0 wt % to not more than 1.5 wt %, Si: not less than 0 wt % to not more than 1.0 wt %, Y: not less than 0 wt % to not more than 1.0 wt %, La: not less than 0 wt % to not more than 1.0 wt %, Ce: not less than 0 wt % to not more than 1.0 wt %, Zr: not less than 0 wt % to not more than 1.0 wt %, and the remainder consisting of Ni and unavoidable impurities, is coated.

2. The heat resistant material according to claim 1, wherein the Ni-based superalloy has a composition containing Al: not less than 3.5 wt % to not more than 7.0 wt %, Ta: not less than 2.0 wt % to not more than 12.0 wt %, Mo: not less than 0 wt % to not more than 4.5 wt %, W: not less than 0 wt % to not more than 10.0 wt %, Re: not less than 0 wt % to not more than 8.0 wt %, Hf: not less than 0 wt % to not more than 0.50 wt %, Cr: not less than 1.0 wt % to not more than 15.0 wt %, Co: not less than 2 wt % to not more than 16 wt %, Ru: not less than 0 wt % to not more than 14.0 wt %, Nb: not less than 0 wt % to not more than 2.0 wt %, Si: not less than 0 wt % to not more than 2.0 wt %, and the remainder consisting of Ni and unavoidable impurities and the coating material has a composition containing Al: not less than 6.1 wt % to not more than 10.6 wt %, Ta: not less than 0 wt % to not more than 10.5 wt %, Mo: not less than 0 wt % to not more than 3.9 wt %, W: not less than 0 wt % to not more than 8.2 wt %, Re: not less than 0 wt % to not more than 3.4 wt %, Ti: not less than 0 wt % to not more than 1.7 wt %, Hf: not less than 0 wt % to not more than 1.15 wt %, Cr: not less than 0.4 wt % to not more than 6.0 wt %, Co: not less than 3.2 wt % to not more than 10.2 wt %, Ru: not less than 0 wt % to not more than 6.2 wt %, Nb: not less than 0 wt % to not more than 1.5 wt %, Si: not less than 0 wt % to not more than 1.0 wt %, Y: not less than 0 wt % to not more than 1.0 wt %, La: not less than 0 wt % to not more than 1.0 wt %, Ce: not less than 0 wt % to not more than 1.0 wt %, Zr: not less than 0 wt % to not more than 1.0 wt %, and the remainder consisting of Ni and unavoidable impurities.

3. The heat resistant material according to claim 1, wherein the Ni-based superalloy has a composition containing Al: not less than 5.0 wt % to not more than 7.0 wt %, Ta: not less than 4.0 wt % to not more than 10.0 wt %, Mo: not less than 1.1 wt % to not more than 4.5 wt %, W: not less than 4.0 wt % to not more than 10.0 wt %, Re: not less than 3.1 wt % to not more than 8.0 wt %, Hf: not less than 0 wt % to not more than 0.50 wt %, Cr: not less than 2.0 wt % to not more than 10.0 wt %, Co: not less than 0 wt % to not more than 15.0 wt %, Ru: not less than 4.1 wt % to not more than 14.0 wt %, Nb: not less than 0 wt % to not more than 2.0 wt %, Si: not less than 0 wt % to not more than 2.0 wt %, and the remainder consisting of Ni and unavoidable impurities and the coating material has a composition containing Al: not less than 6.1 wt % to not more than 10.6 wt %, Ta: not less than 0 wt % to not more than 10.5 wt %, Mo: not less than 0 wt % to not more than 3.9 wt %, W: not less than 0 wt % to not more than 8.2 wt %, Re: not less than 0 wt % to not more than 3.4 wt %, Ti: not less than 0 wt % to not more than 1.7 wt %, Hf: not less than 0 wt % to not more than 1.15 wt %, Cr: not less than 0.4 wt % to not more than 6.0 wt %, Co: not less than 3.2 wt % to not more than 10.2 wt %, Ru: not less than 0 wt % to not more than 6.2 wt %, Nb: not less than 0 wt % to not more than 1.5 wt %, Si: not less than 0 wt % to not more than 1.0 wt %, Y: not less than 0 wt % to not more than 1.0 wt %, La: not less than 0 wt % to not more than 1.0 wt %, Ce: not less than 0 wt % to not more than 1.0 wt %, Zr: not less than 0 wt % to not more than 1.0 wt %, and the remainder consisting of Ni and unavoidable impurities.

4. The heat resistant material according to claim 1, wherein the Ni-based superalloy has a composition containing Al: not less than 5.0 wt % to not more than 7.0 wt %, Ta: not less than 4.0 wt % to not more than 8.0 wt %, Mo: not less than 1.0 wt % to not more than 4.5 wt %, W: not less than 4.0 wt % to not more than 8.0 wt %, Re: not less than 3.0 wt % to not more than 6.0 wt %, Hf: not less than 0.01 wt % to not more than 0.50 wt %, Cr: not less than 2.0 wt % to not more than 10.0 wt %, Co: not less than 0.1 wt % to not more than 15.0 wt %, Ru: not less than 1.0 wt % to not more than 4.0 wt %, Nb: not less than 0 wt % to not more than 2.0 wt %, and the remainder consisting of Ni and unavoidable impurities and the coating material has a composition containing Al: not less than 6.1 wt % to not more than 10.6 wt %, Ta: not less than 0 Wt % to not more than 10.5 wt %, Mo: not less than 0 wt % to not more than 3.9 wt %, W: not less than 0 wt % to not more than 8.2 wt %, Re: not less than 0 wt % to not more than 3.4 wt %, Ti: not less than 0 wt % to not more than 1.7 wt %, Hf: not less than 0 wt % to not more than 1.15 wt %, Cr: not less than 0.4 wt % to not more than 6.0 wt %, Co: not less than 3.2 wt % to not more than 10.2 wt %, Ru: not less than 0 wt % to not more than 6.2 wt %, Nb: not less than 0 wt % to not more than 1.5 wt %, Si: not less than 0 wt % to not more than 1.0 wt %, Y: not less than 0 wt % to not more than 1.0 wt %, La: not less than 0 wt % to not more than 1.0 wt %, Ce: not less than 0 wt % to not more than 1.0 wt %, Zr: not less than 0 wt % to not more than 1.0 wt % and the remainder consisting of Ni and unavoidable impurities.

5. The heat resistant material according to claim 1 wherein the Ni-based superalloy has a composition containing Al: not less than 4.8 wt % to not more than 5.8 wt %, Ta: not less than 5.5 wt % to not more than 6.5 wt %, Mo: not less than 1.4 wt % to not more than 2.4 wt %, W: not less than 8.2 wt % to not more than 9.2 wt %, Re: not less than 1.6 wt % to not more than 2.6 wt %, Ti: not less than 0 wt % to not more than 2.0 wt %, Nb: not less than 0 wt % to not more than 2.0 wt %, Hf: not less than 0 wt % to not more than 0.50 wt %, Cr: not less than 4.4 wt % to not more than 5.4 wt %, Co: not less than 7.3 wt % to not more than 8.3 wt %, and the remainder consisting of Ni and unavoidable impurities and the coating material has a composition containing Al: not less than 6.9 wt % to not more than 8.9 wt %, Ta: not less than 8.5 wt % to not more than 10.5 wt %, Mo: not less than 0 wt % to not more than 1.9 wt %, W: not less than 6.2 wt % to not more than 8.2 wt %, Re: not less than 0 wt % to not more than 1.5 wt %, Ti: not less than 0 wt % to not more than 1.7 wt %, Hf: not less than 0 wt % to not more than 1.15 wt %, Cr: not less than 0.4 wt % to not more than 2.4 wt %, Co: not less than 3.7 wt % to not more than 5.7 wt %, Nb: not less than 0 wt % to not more than 1.5 wt %, and the remainder consisting of Ni and unavoidable impurities.

* * * * *